(12) United States Patent
Currle (10) Patent No.: US 11,951,807 B2
(45) Date of Patent: Apr. 9, 2024

(54) VENTILATION DEVICE, METHOD AND VEHICLE

(71) Applicant: Mercedes-Benz Group AG, Stuttgart (DE)

(72) Inventor: Joachim Currle, Stuttgart (DE)

(73) Assignee: Mercedes-Benz Group AG, Stuttgart (DE)

( * ) Notice: Subject to any disclaimer, the term of this patent is extended or adjusted under 35 U.S.C. 154(b) by 0 days.

(21) Appl. No.: 17/783,221

(22) PCT Filed: Dec. 3, 2020

(86) PCT No.: PCT/EP2020/084396
§ 371 (c)(1),
(2) Date: Jun. 7, 2022

(87) PCT Pub. No.: WO2021/122021
PCT Pub. Date: Jun. 24, 2021

(65) Prior Publication Data
US 2023/0013820 A1    Jan. 19, 2023

(30) Foreign Application Priority Data
Dec. 18, 2019 (DE) .................... 10 2019 008 782.8

(51) Int. Cl.
*B60H 1/24* (2006.01)
(52) U.S. Cl.
CPC ................... *B60H 1/241* (2013.01)
(58) Field of Classification Search
CPC .. B60H 1/241; B60H 1/245; B60H 2001/003; B60H 1/00285; B60H 1/247; B60H 2001/00228; B60N 2/0244; B60N 2/5671
See application file for complete search history.

(56) References Cited

U.S. PATENT DOCUMENTS

| 2,301,512 A | 11/1942 | Breese |
| 2,336,089 A | 12/1943 | Gould |
| 2,430,335 A | 11/1947 | Hart |

(Continued)

FOREIGN PATENT DOCUMENTS

| DE | 10 2016 202 291 A1 | 8/2017 |
| DE | 10 2016 117 443 A1 | 11/2017 |

(Continued)

OTHER PUBLICATIONS

Translation, WO-2011070132-A1, Algueera G J M, Jun. 2011 (Year: 2011).*

(Continued)

*Primary Examiner* — Jessica Yuen
(74) *Attorney, Agent, or Firm* — Crowell & Moring LLP (57) ABSTRACT

A ventilation device of a vehicle includes an air outflow opening disposed on an upper side of a backrest of a seat of the vehicle such that an airflow from the air outflow opening flows in a direction of a roof of the vehicle. A plurality of air guiding elements are pivotably mounted in a region of the air outflow opening where an air volume of a front partial airflow and a rear partial airflow is settable by the plurality of air guiding elements. A further air guiding element is disposed on the roof in a region of the airflow where the airflow is dividable and deflectable by the further air guiding element.

7 Claims, 12 Drawing Sheets (56) References Cited

U.S. PATENT DOCUMENTS

| | | | |
|---|---|---|---|
| 2,989,854 A | 6/1961 | Gould | |
| 2021/0129624 A1* | 5/2021 | Nagahama | ......... B60H 1/00871 |

FOREIGN PATENT DOCUMENTS

| | | | | |
|---|---|---|---|---|
| FR | 2 843 916 A1 | | 3/2004 | |
| FR | 2 897 815 A1 | | 8/2007 | |
| JP | 2013-95296 A | | 5/2013 | |
| WO | WO-2011070132 A1 | * | 6/2011 | ........... B62D 35/001 |

OTHER PUBLICATIONS

PCT/EP2020/084396, International Search Report dated Feb. 16, 2021 (Two (2) pages).

* cited by examiner

VENTILATION DEVICE, METHOD AND VEHICLE

BACKGROUND AND SUMMARY OF THE INVENTION

The invention relates to a ventilation device for a vehicle having a vehicle seat, which has an air outflow opening in the region of a backrest. Furthermore, the invention relates to a method for operating the ventilation device and a vehicle having such a ventilation device.

A vehicle seat having a seat part, a backrest and a ventilation device and a method for air-conditioning such a vehicle seat are known from DE 10 2016 117 443 A1. The ventilation device comprises a forwards air channel system with air outlets for blowing air out forwards through the seat surface provided for a seat user and facing towards them. In addition, the ventilation device comprises a backwards air channel system having at least one air outlet for blowing out air backwards. Furthermore, the ventilation device has a fan device for generating an airflow in the forwards air channel system and the backwards air channel system, wherein the forwards air channel system and the backwards air channel system are connected or can be connected to each other in a fluid-dynamic manner via a connection tract.

An automatic air-conditioning system is described in U.S. Pat. No. 2,430,335 A. A car or similar vehicle having a sealed passenger chamber has means for letting out air inwardly in the direction of an intermediary region of the roof of the passenger chamber and means extending downwardly from the roof in this intermediary region for guiding the air from the front to the back in the passenger chamber. These means extending downwardly from the roof can be adjusted in the longitudinal direction in order to thus variably regulate the air distribution inside the passenger chamber.

A vehicle cooling system is known from U.S. Pat. No. 2,989,854 A. A motor-operated vehicle has a passenger chamber with front seats and back seats. A cooling system of the vehicle comprises a compressor, a capacitor, an evaporator and coolant current connections between them, wherein the compressor is driven by the motor of the vehicle. A conduit extends forwards along the base of the passenger chamber next to the backseat and, from there, upwards along the rear side of the front seat, having an outlet on the upper end between base and roof of the passenger chamber. The evaporator is in the part of this conduit extending forwards. A first fan for an airflow in the direction of the outlet is provided in the conduit. A single one-piece cover is fixed on the roof of the passenger chamber, the cover having a central inlet opening, which is arranged above the outlet of the conduit, spaced apart from this. The cover has the shape of a flat, pan-shaped structure, in order to reduce its vertical extension from the roof of the passenger chamber to a minimum. A second fan is provided inside the cover for sucking the air flowing out of the outlet of the conduit through the inlet opening of the cover. The cover has outlet openings that are spaced apart from its central inlet opening. The second fan blows the air horizontally through the outlet openings in a plurality of directions along the roof of the passenger chamber, wherein walls of the passenger chamber divert the airflow.

The object of the invention is to specify an improved ventilation device for a vehicle in comparison to the prior art, a method for operating the ventilation device and a vehicle having such a ventilation device.

A ventilation device for a vehicle comprises a vehicle seat, which has an air outflow opening in the region of a backrest. The air outflow opening is arranged on an upper side of the backrest, such that an air current in flows in the direction of the vehicle roof, wherein a number of air guiding element that can be positioned is arranged inside the air outflow opening, and at least one further air guiding element for dividing and deflecting the airflow is arranged on the vehicle roof in the region of the emerging airflow.

A ventilation of the headspace region of the vehicle which is substantially free of drafts, close to the body and thus energy efficient, in particular for any positions of the vehicle seat in the vehicle, with cold air is possible by means of a ventilation device formed in such a way.

As a result of the arrangement of the air outflow opening on the upper side of the backrest of the vehicle seat, further air outflow openings present in the vehicle, for example in the region of an instrument panel of the vehicle, can be omitted.

In one design of the ventilation device, the first air guiding element is formed to divide the airflow into a front partial airflow and a rear partial airflow. Thus, it is possible to ventilate both a front region and a rear region of the vehicle, in particular a back seat region, for example with cold air with comparatively high surroundings temperature.

According to the invention, the air guiding elements arranged in the region of the air outflow opening are pivotably mounted for adjusting a strength of the front partial airflow and rear partial airflow. Thus, it can be achieved that the front partial airflow is stronger than the rear partial airflow, in order to not expose a vehicle occupant in the back seat region to an excessively strong rear partial airflow and thus to a draft causing muscle tension. Alternatively, the air guiding elements can be positioned in such a way that the rear partial airflow is more greatly pronounced than the front partial airflow.

In a development of the ventilation device, the back rest has a widening in a region of the upper side in the direction of a longitudinal axis of the vehicle, such that an air outflow cross-section of the air outflow opening is enlarged and can thus optimise a respective ventilation.

In an additional or alternative embodiment, a flap element pivotably mounted to enlarge the air outflow opening with a number of air guiding elements is arranged in an upper region of the backrest of the seat. The folding element can be positioned in a functional position and a non-functional position, wherein the air outflow opening, in particular its air outflow cross-section, is enlarged by means of the flap element and the respective ventilation can be optimised.

In a possible embodiment, the further air guiding element is formed as a plate and is arranged pivotably on the vehicle roof to divide and deflect the airflow. The further air guiding element formed as a plate can be positioned from a non-functional position into a functional position by means of its pivotable arrangement, such that the airflow can be deflected and divided as needed.

In a further additional or alternative embodiment, the further air guiding element is formed to be inflatable for dividing and deflecting the airflow, wherein the further air guiding element in the inflated state has the functional position and in the uninflated state has the non-functional position.

To deflect the front partial airflow, an air deflection element is arranged in a front region of the vehicle roof, such that the front partial airflow can be deflected, in particular depending on a position of the vehicle seat in the vehicle, in such a way that a head space region of a vehicle user on the vehicle seat is ventilated.

Moreover, the invention relates to a method for operating such a ventilation device, wherein it is provided according to the invention that the air guiding elements and, optionally, the pivotably mounted flap element, the further air guiding element and/or the air deflection element are positioned or is positioned automatically depending on a position of the vehicle seat in the vehicle, depending on an inclination of the backrest, depending on a seat occupancy and/or depending on comfort and draft sensitivity of a vehicle user and/or vehicle occupant.

By using the method, it is possible to optimally adjust a partial airflow generated accordingly at least by means of the air guiding elements and the further air guiding element in relation to the vehicle user and/or a vehicle occupant in the back seat region.

In addition, the invention relates to a vehicle having such a ventilation device, with which it is possible to deflect the airflow flowing out of the air outflow opening and to divide it in relation to a vehicle interior, wherein a strength of the respectively generated partial airflow can be adjusted.

Exemplary embodiments of the invention are explained in more detail below by means of the drawings.

DETAILED DESCRIPTION OF THE DRAWINGS

Parts corresponding to one another are provided with the same reference numerals in all figures.

Figure 1:
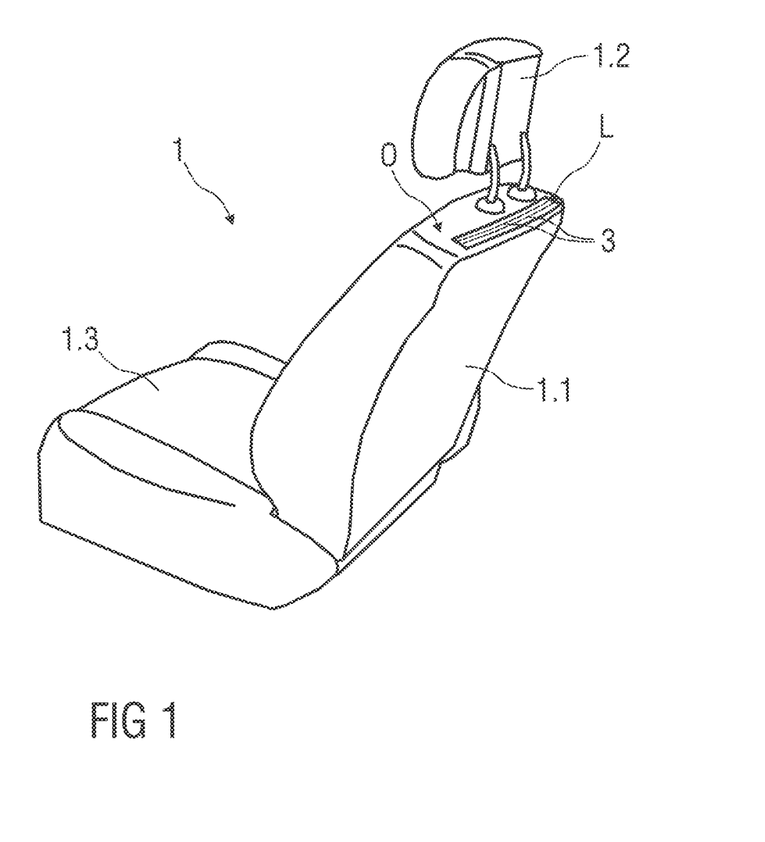
FIG. 1, schematically, is a perspective view of a vehicle seat with an air outflow opening.

FIG. 1 shows a perspective view of a vehicle seat 1, in particular a so-called single seat, having a backrest 1.1 of the seat, on which a headrest 1.2 is arranged, and a seat part 1.3.

Figure 2:
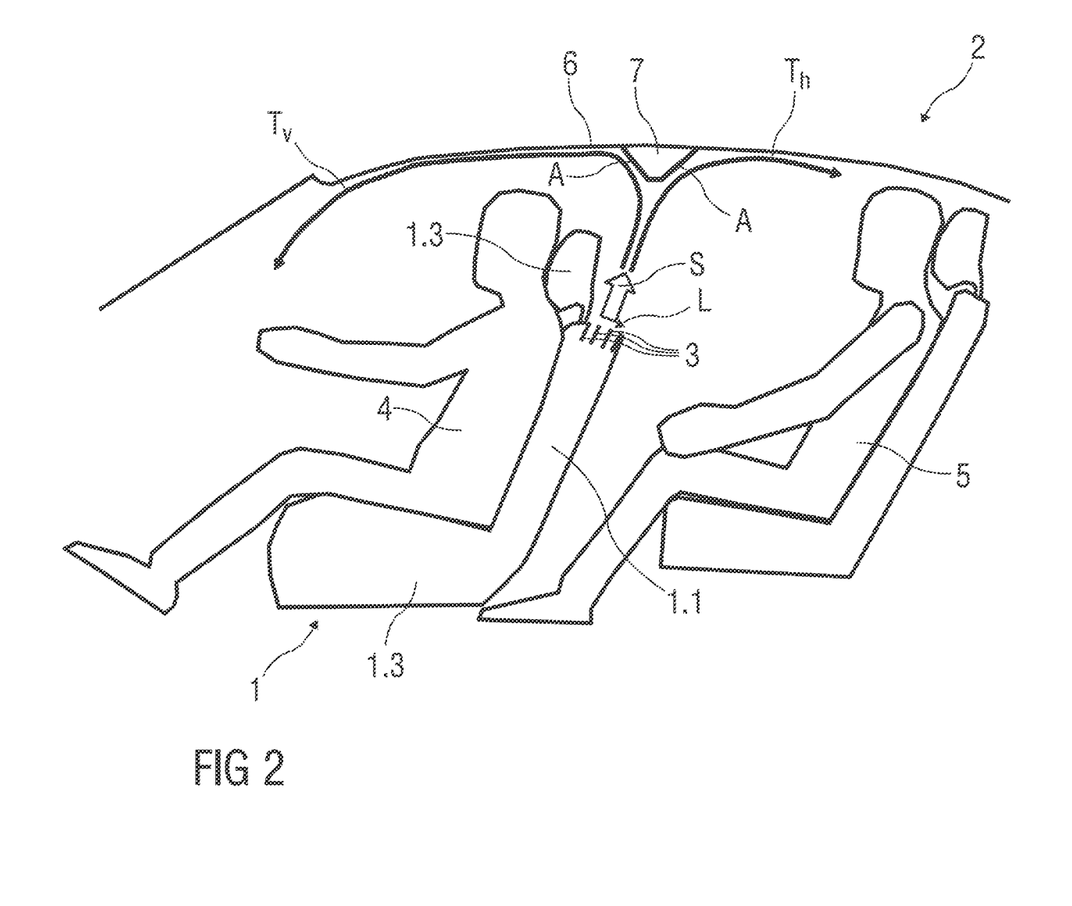
FIG. 2, schematically, shows a vehicle with a vehicle seat according to FIG. 1 and a further air guiding element arranged on a vehicle roof.

The headrest 1.2 is arranged on an upper side O of the backrest 1.1, wherein an air outflow opening L of a ventilation device of a vehicle 2, partially shown inter alia in FIG. 2, is arranged behind the headrest 1.2, i.e., in the direction of a rear side of the backrest 1.1.

Several air guiding elements 3 are pivotably arranged in the region of the air outflow opening L for deflecting an airflow S flowing out of the air outflow opening L and shown in the figures below.

In order to be able to prevent as far as possible, when cold air flows out of the air outflow opening L, this striking a vehicle user 4 shown in more detail in FIG. 2 or a vehicle occupant 5 also shown in FIG. 2, such that muscle tensioning due to a draft does not occur, the ventilation device is designed as described below.

The vehicle seat 1 has the air outflow opening L with the adjustable air guiding element 3, whereby a desired air outlet direction can be set.

In order to ventilate a head space of the vehicle 2 as far as possible without drafts, an air outflow cross-section of the air out-flow opening L is chosen to be comparatively large, wherein a further air guiding element 7 with two air guiding surfaces A is arranged on a vehicle roof 6 for guiding the airflow S, in particular a cold airflow, without drafts.

FIG. 2 shows a cut-out of a vehicle 2 with the vehicle seat 1, a vehicle user 4 sitting on it, a vehicle occupant 5 in the back seat region of the vehicle 2 and the further air guiding element 7 on the vehicle roof 6 in a possible embodiment.

According to the present exemplary embodiment in FIG. 2, the airflow S flowing out of the air outflow opening L encounters the further air guiding element 7, whereby the airflow S is divided into a front partial airflow $T_v$ and a rear partial airflow $T_h$.

The respective partial airflow $T_v$, $T_h$ flows along on the corresponding air guiding surface A of the further air guiding element 7, such that the front partial airflow $T_v$ is supplied to a front region and the rear partial airflow $T_h$ to a rear region, so the back seat region of the vehicle 2 according to the present exemplary embodiment.

In the embodiment shown in FIG. 2, the further air guiding element 7 is arranged on the vehicle roof 6 or is formed on this, wherein the further air guiding element 7 is arranged below a cladding K of the vehicle roof 6 shown in sections in FIGS. 10 and 11 and can thus be perceived by an observer as a moulding of the vehicle roof 6.

The two partial airflows $T_v$, $T_h$ formed by means of the further air guiding element 7 have substantially the same strength, i.e., the same volume flow.

Figure 3:
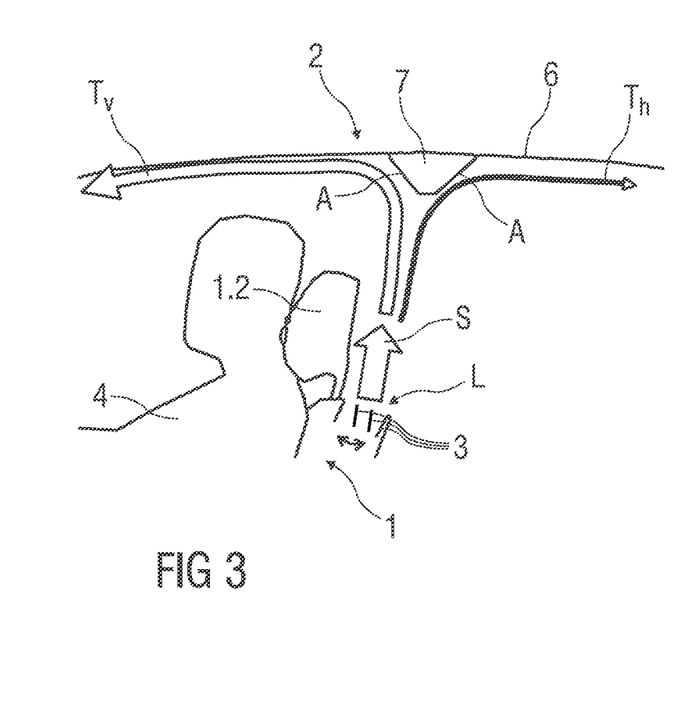
FIG. 3, schematically, is a cross-section of the vehicle with an adjusted stronger front partial airflow.
Figure 4:
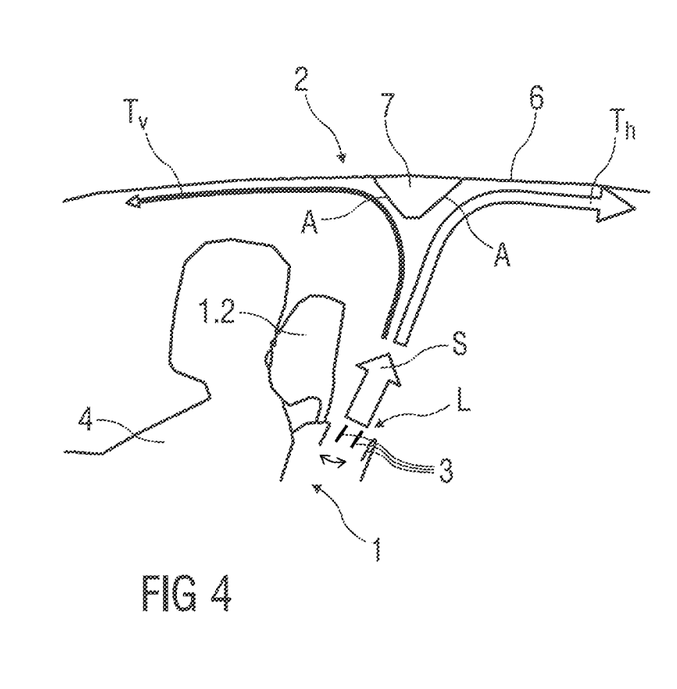
FIG. 4, schematically, is a cut-out of the vehicle with an adjusted stronger rear partial airflow.

In order to adjust a respective partial airflow $T_v$, $T_h$ in relation to its strength, the air guiding elements 3 of the air outflow opening L can be positioned correspondingly, as is shown in FIGS. 3 and 4.

In FIG. 3, the air guiding elements 3 are positioned in relation to the further air guiding element 7 in such a way that a larger part of the airflow S meets the air guiding surface A facing towards the front region of the vehicle 2, and the front partial airflow $T_v$ thus guides more air, in particular cold air, than the rear partial airflow $T_h$.

FIG. 4 shows an exemplary embodiment in which the air guiding elements 3 of the air outflow opening L are positioned in the direction of the back seat region, such that a larger part of the airflow S than the rear partial airflow $T_h$ flows into the back seat region of the vehicle 2.

By means of the air guiding elements 3 and the further air guiding element 7, it is possible to exactly set a ratio of the two partial airflows $T_v$, $T_h$, such that it is possible, for example, if there is no vehicle passenger 5 in the back seat region, to guide the entire airflow S into the front region of the vehicle 2, such that no air or comparatively only very little air is supplied to the back seat region.

In particular, the positioning of the air guiding elements 3 results in how the airflow S meets the further air guiding element 7 and, as a result of this, is distributed differently in the interior chamber of the vehicle.

Figure 5:
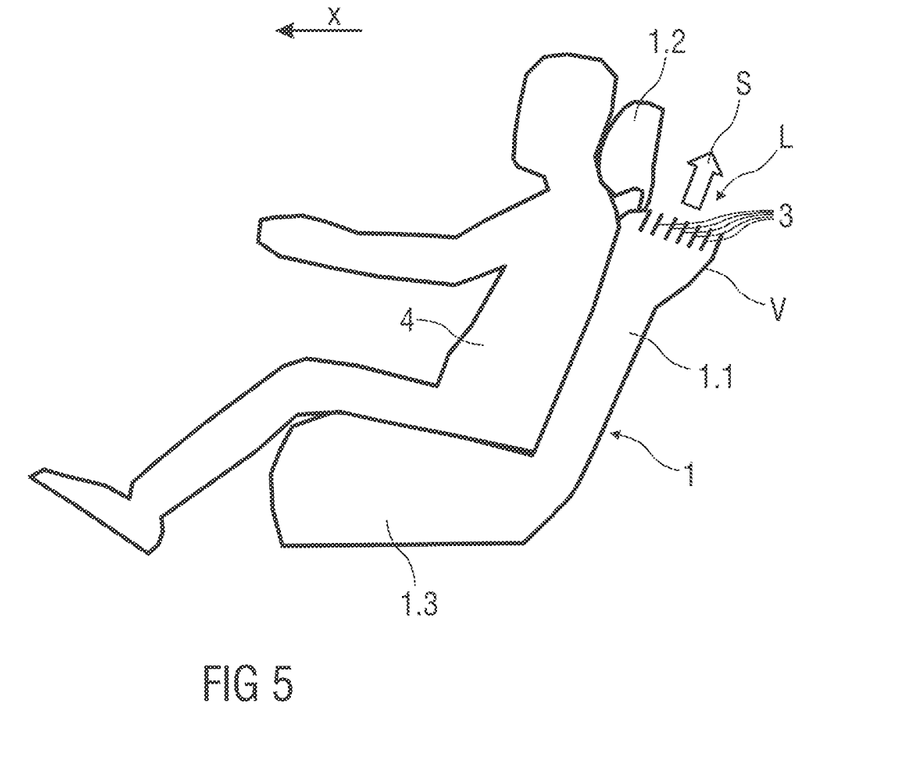
FIG. 5, schematically, shows the vehicle seat in a possible embodiment.

FIG. 5 shows the vehicle seat 1 in a possible embodiment, wherein the backrest 1.1 of the seat has a widening V in a region of the upper side O in the direction of a longitudinal axis x of the vehicle, in order to enlarge the air outflow cross-section of the air outflow opening L, such that a ventilation without drafts of an interior chamber of the vehicle is possible to the greatest extent.

Figure 6:
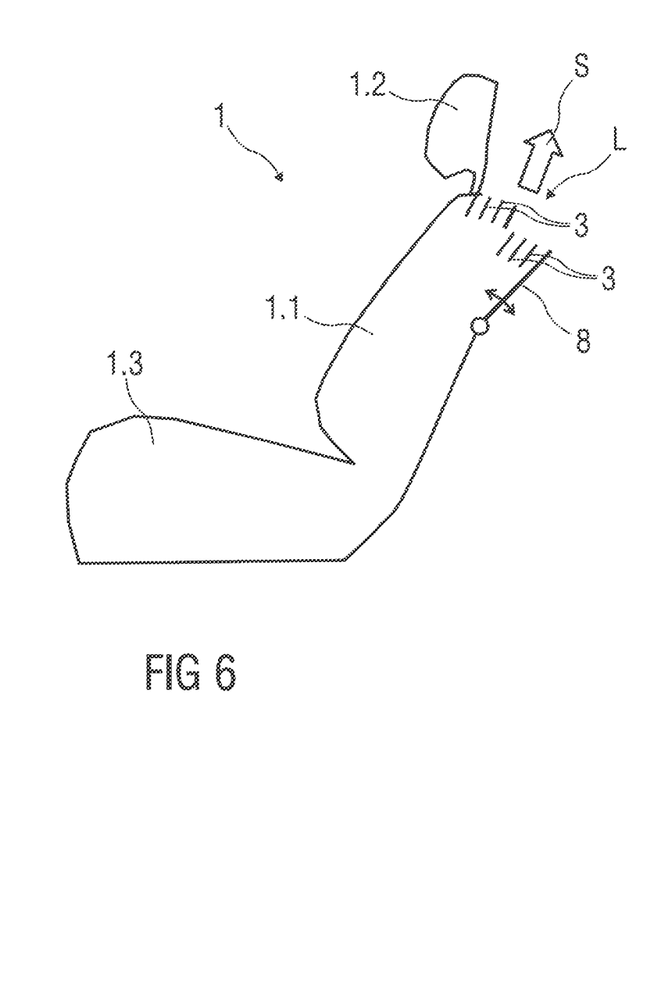
FIG. 6, schematically, shows the vehicle seat in an alternative embodiment with pivoted flap element.
Figure 7:
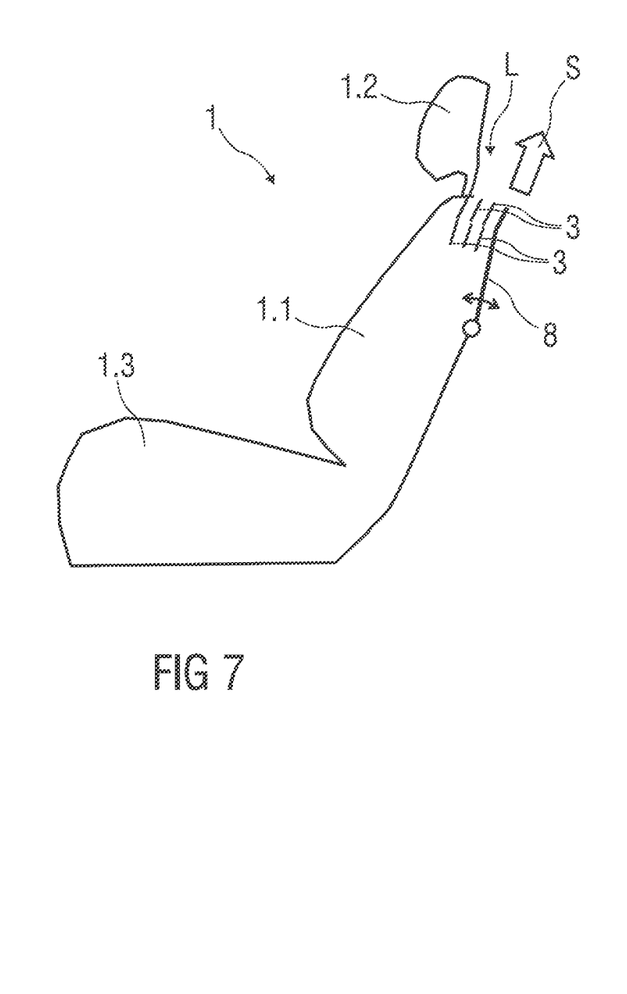
FIG. 7, schematically, shows the vehicle seat in the alternative embodiment with closed flap element.

FIGS. 6 and 7 show the vehicle seat 1 in an alternative embodiment, wherein the widening V by means of a flap element 8 pivotably mounted around an axis of rotation, the flap element being shown in a functional position in FIG. 6 and in a non-functional position in FIG. 7.

In the functional position, the flap element 8 is pivoted away from the backrest 1.1, whereby the air outflow cross-section and thus the air outflow opening L are enlarged.

In the non-functional position, the flap element 8 is pivoted in the direction of the backrest 1.1, such that the air outflow opening L has its original air outflow cross-section.

Figure 8:
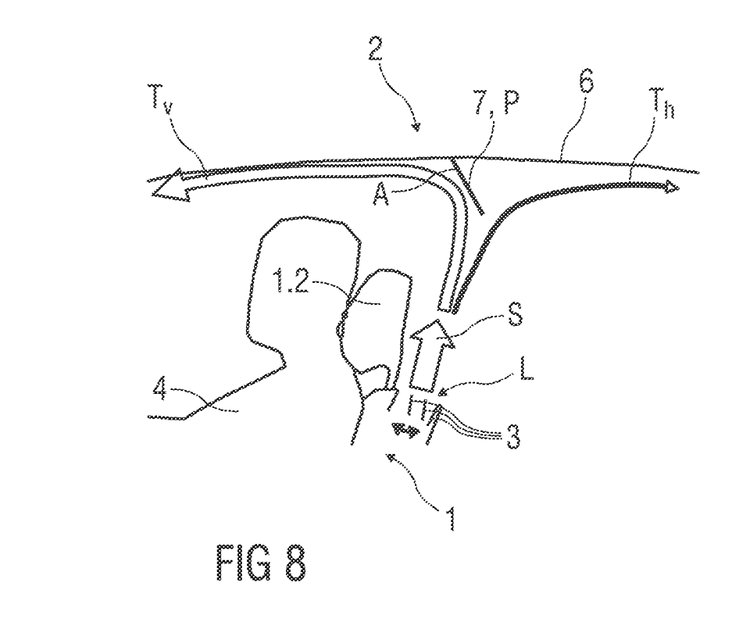
FIG. 8, schematically, is a cut-out of the vehicle with the further air guiding element formed as a plate in a functional position.
Figure 9:
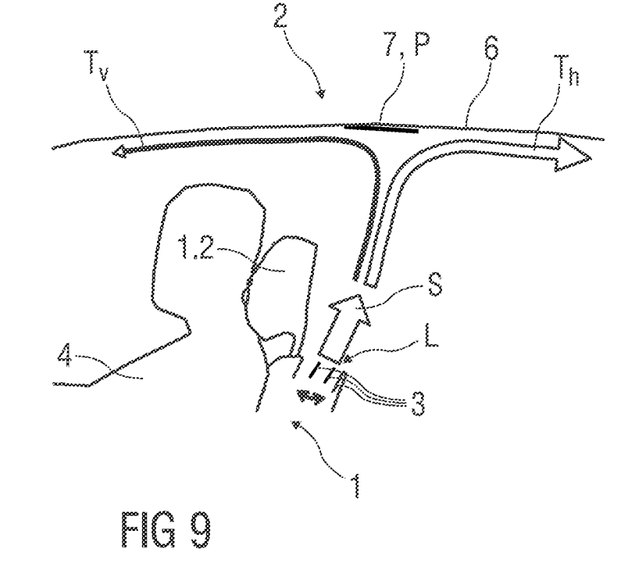
FIG. 9, schematically, a cut-out of the vehicle with the further air guiding element formed as a plate in a non-functional position.

In FIGS. 8 and 9, the further air guiding element 7 is designed as a plate P, which is arranged pivotably on the vehicle roof 6. Here, the plate 6 is shown in a functional position in FIG. 8 and in a non-functional position in FIG. 9.

In the functional position, the further air guiding element 7 designed as a plate P protrudes from the vehicle roof 6 into the interior chamber of the vehicle, wherein as a result of a corresponding positioning of the plate P, the airflow S meets it and is thus correspondingly divided and deflected.

In particular, the airflow S is divided and deflected by the positioning of the plate P as the further air guiding element 7 and a corresponding activating angle. Thus, various intermediary positions of the further air guiding element 7 designed as a plate P are possible, whereby a flow impulse, in particular an inflow speed, can be adjusted individually for the vehicle user 4 and the vehicle occupant 5.

If the further air guiding element 7 designed as a plate is positioned as shown in FIG. 8, the front partial airflow $T_v$ guides a larger air volume than the rear partial airflow $T_h$. For example, the vehicle user 4 is less sensitive to drafts for such an adjustment.

In contrast, if the further air guiding element 7 designed as a plate P is positioned in the non-functional position, such that the plate P abuts as far as possible on the vehicle roof 6, the rear partial airflow $T_h$ guides a greater air volume than the front partial airflow $T_v$ depending on the positioning of the air guiding elements 3. This adjustment is suitable, in particular, when the vehicle user 4 is sensitive to drafts.

Figure 10:
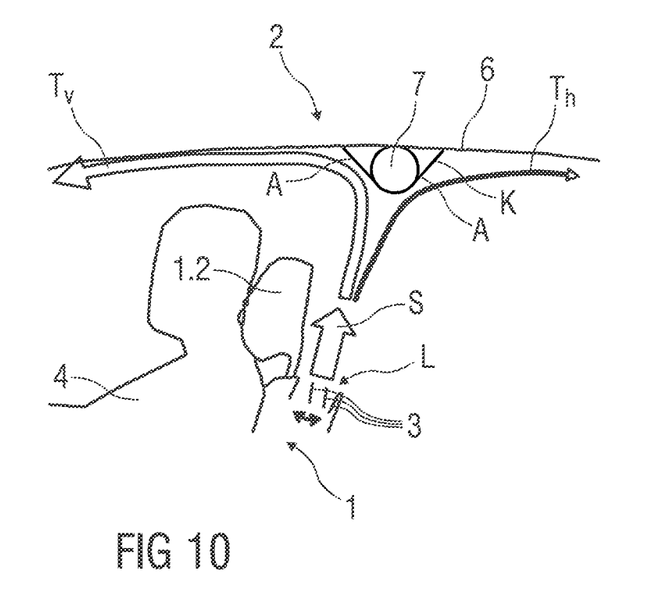
FIG. 10, schematically, is a cut-out of the vehicle with an inflatably formed further air guiding element in a functional position.
Figure 11:
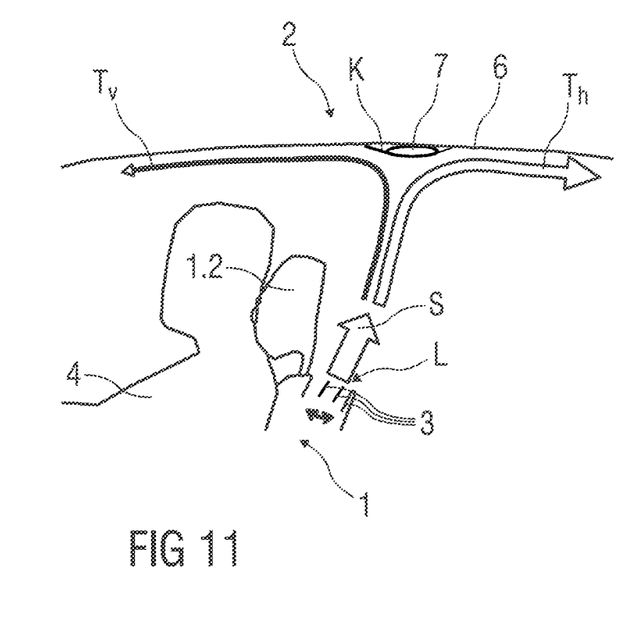
FIG. 11, schematically, is a cut-out of the vehicle with the inflatably formed air guiding element in a non-functional position.

An alternative embodiment of the further air guiding element 7 is shown in FIGS. 10 and 11, wherein the further air guiding element 7 is formed to be inflatable and, in its functional position, has the shape of a circular cylinder. Here, the inflatable further air guiding element 7 is arranged below the cladding K of the vehicle roof 6 and is thus as far as possible not visible to an observer.

In particular, FIG. 10 shows the further air guiding element 7 in its functional position and FIG. 11 in the non-functional position.

In FIG. 10, the further air guiding element 7 is completely filled with a fluid, in particular air, and the air guiding elements 3 are positioned in such a way that the airflow S is divided by means of the further air guiding element 7 in such a way that the front partial airflow $T_v$ guides a larger air volume than the rear partial airflow $T_h$.

In the non-functional position of the further air guiding element 7, i.e., in the emptied state, and a corresponding positioning of the air guiding elements 3, the rear partial airflow $T_h$ guides a larger air volume than the front partial airflow $T_v$.

Figure 12:
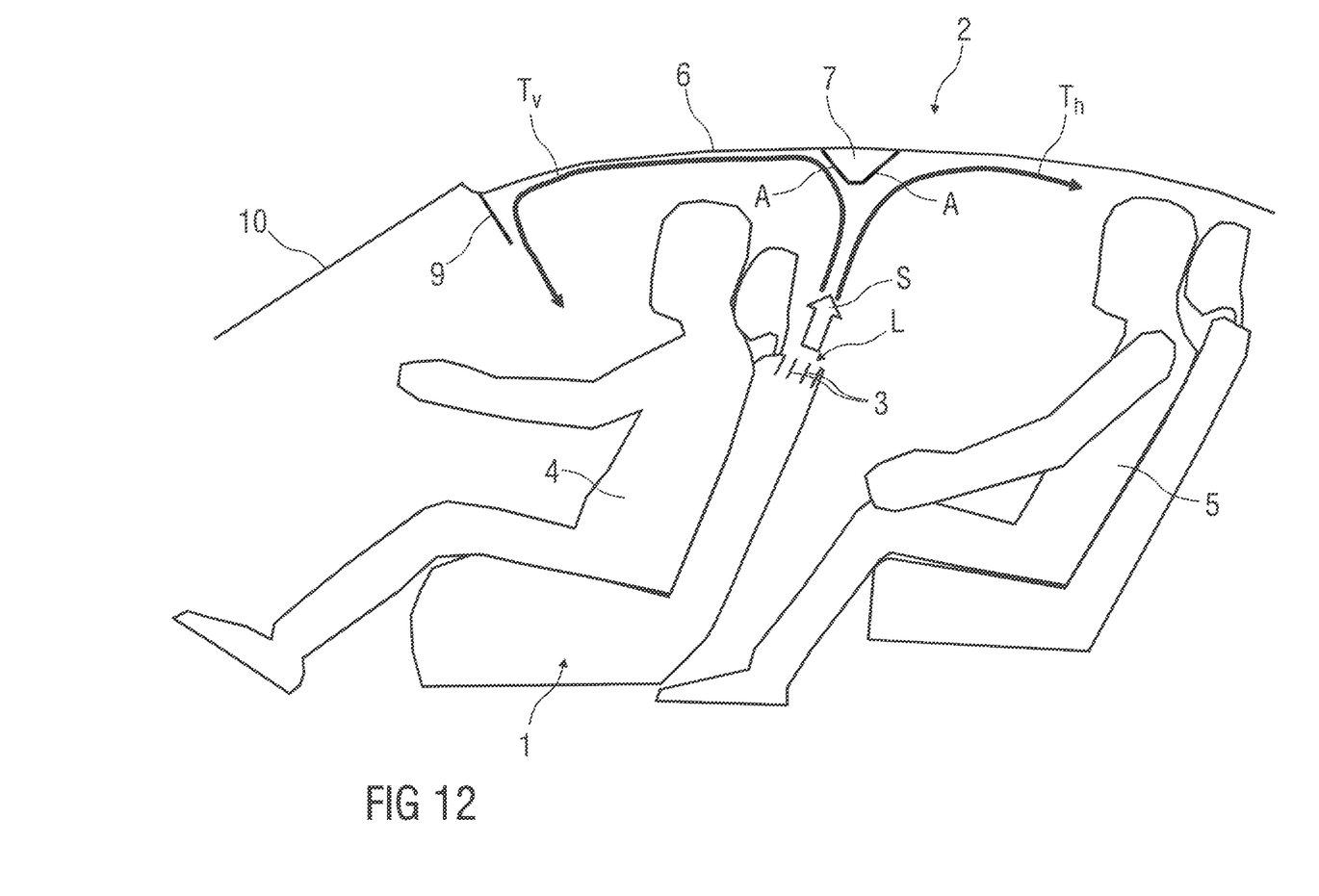
FIG. 12, schematically, shows the vehicle with the vehicle seat, the further air guiding element and an air deflection element in a first embodiment.

FIG. 12 shows an exemplary embodiment in which an air deflection element 9 is arranged in the front region of the vehicle 2, in particular in the region of a windscreen 10, the air deflection element being pivotably mounted in this embodiment.

The front partial airflow $T_v$ can be deflected in the direction of an upper body of the vehicle user 4 by means of the air deflection element 9, which is positioned according to FIG. 12. For example, the air guiding element 9 can be depicted by means of a sun shield allocated to the vehicle user 4.

Figure 13:
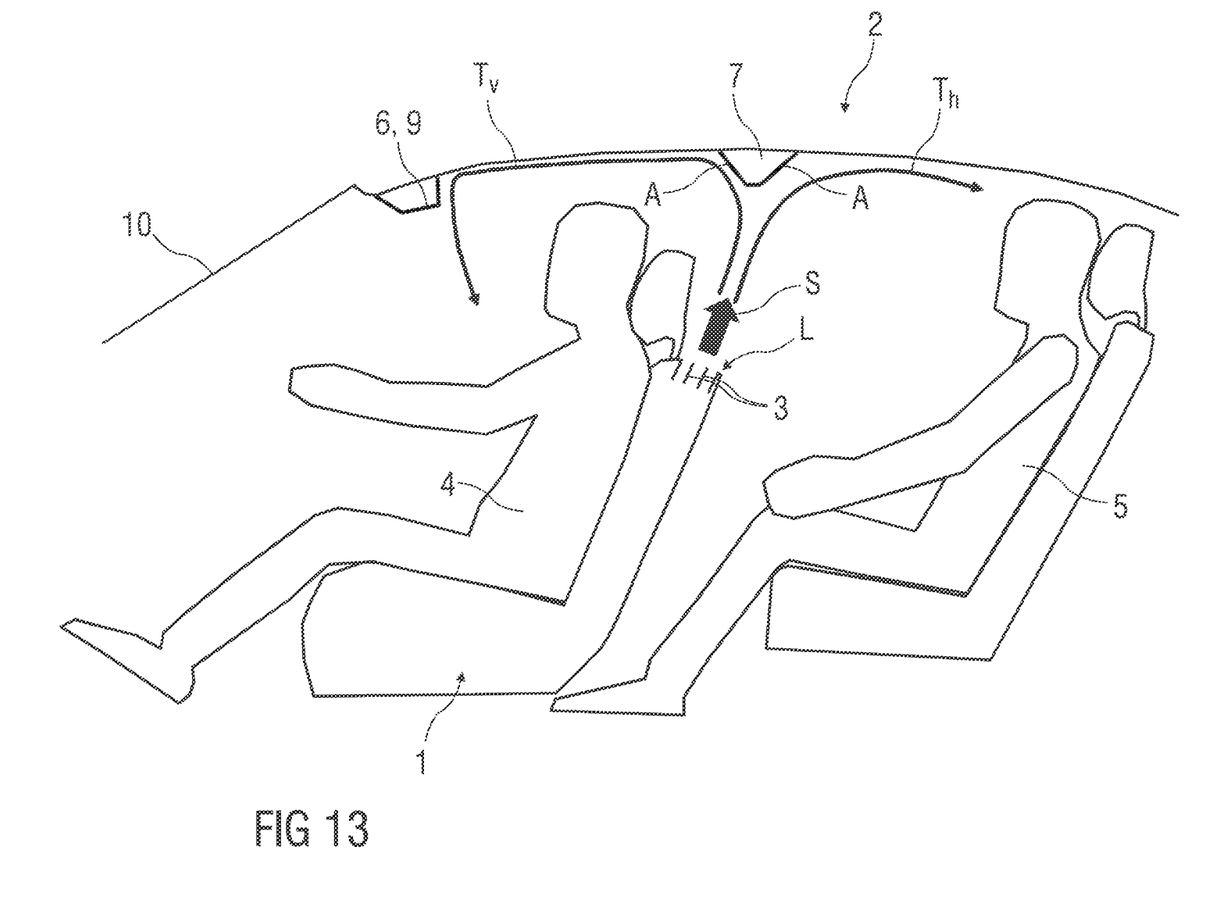
FIG. 13, schematically, shows the vehicle with the vehicle seat, the further air guiding element and an air deflection element in a first embodiment.

In an alternative embodiment shown in FIG. 13, the air deflection element 9 is formed by means of a corresponding moulding of the vehicle roof 6, wherein the front partial airflow $T_v$ is thus deflected continuously in the direction of the upper body of the vehicle user 4.

Figure 14:
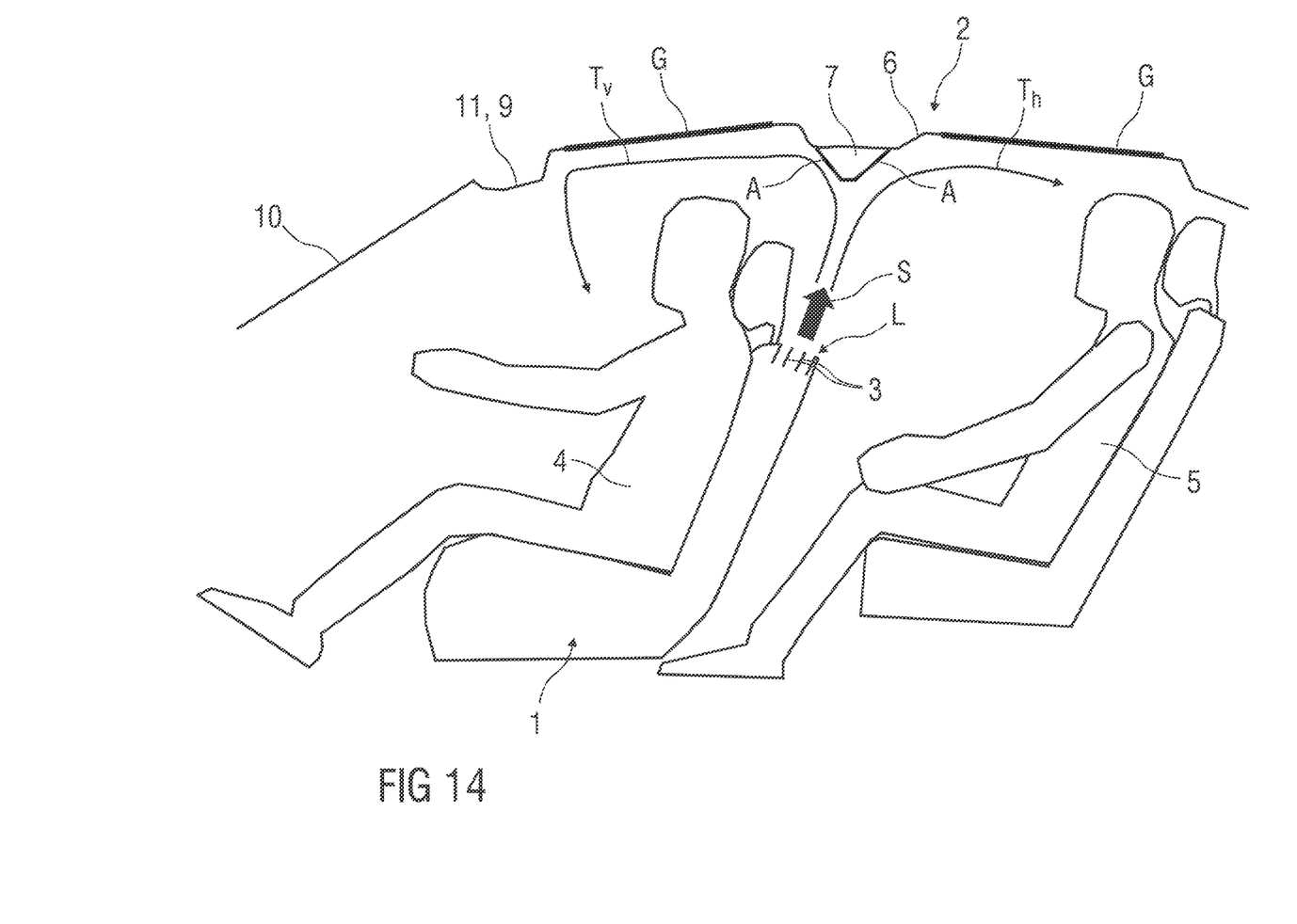
FIG. 14, schematically, shows a vehicle with glass roof section, the vehicle seat, the further air guiding element and the air deflection element in a second embodiment.

In FIG. 14, the vehicle 2 has glass roof portions G, wherein a roof crossmember 11 serves as the air deflection element 9.

Figure 15:
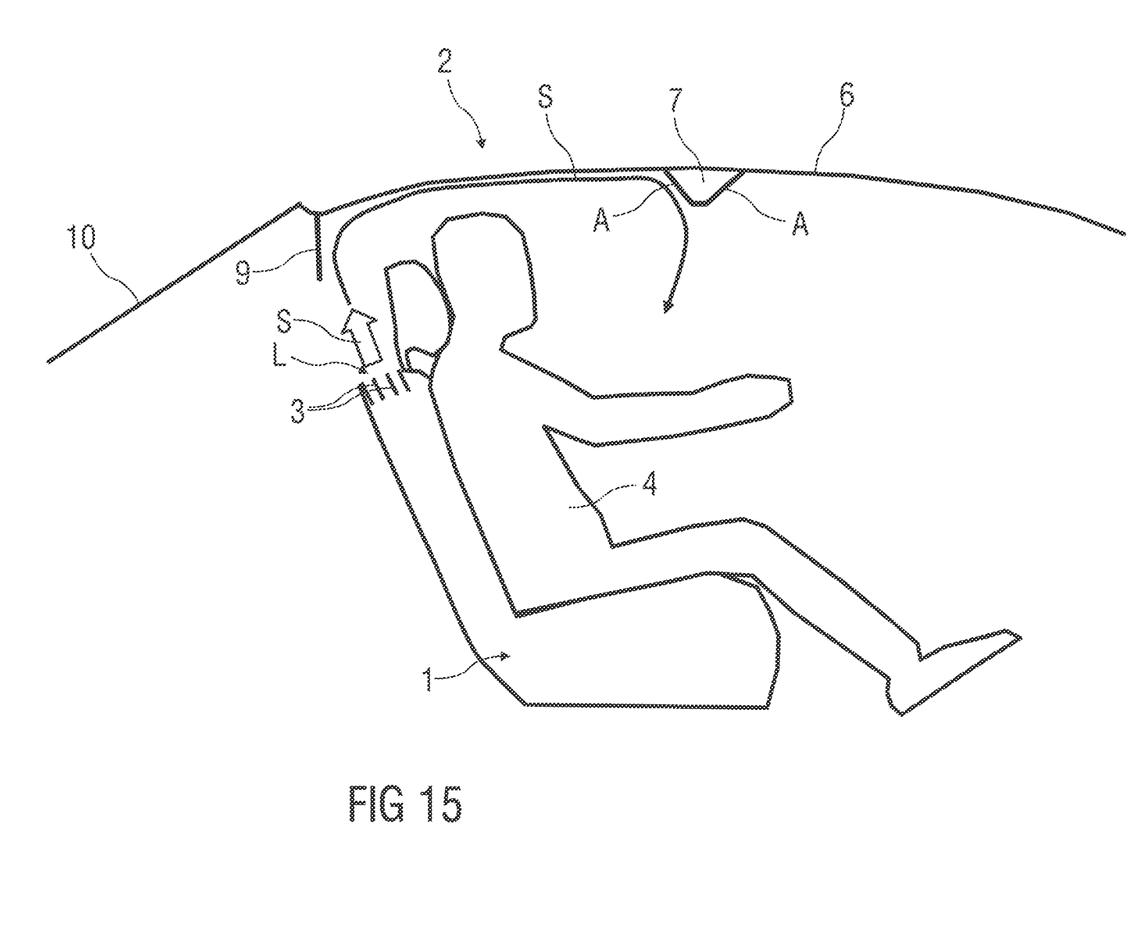
FIG. 15, schematically, shows the vehicle with a vehicle seat positioned in opposition to a driving direction, the air guiding element and the air deflection element in the first embodiment.

In the exemplary embodiment shown in FIG. 15, the vehicle seat 1 of the vehicle user 4 is positioned in opposition to a driving direction of the vehicle 2, wherein the vehicle 2 is moved, for example, in the automatic driving operation.

In this case, the airflow S flowing out of the air outflow opening L flows in the direction of the air deflection element 9 as a result of corresponding positioning of the air guiding elements 3, whereby the airflow S is deflected in the direction of the further air guiding element 7.

The airflow S flows on the air guiding surface A of the further air guiding element 7, such that the airflow S flows in the direction of the upper body of the vehicle user 4.

In particular in relation to the ventilation device, it is provided that the air guiding elements 3, the further air guiding element 7, if provided, the flap element 8 and, if adjustable, the air deflection element 9 are positioned in an operative manner, for example by means of a multiphase engine.

If the further air guiding element 7 is formed to be inflatable, then filling and emptying are also carried out electromotively.

Figure 16:
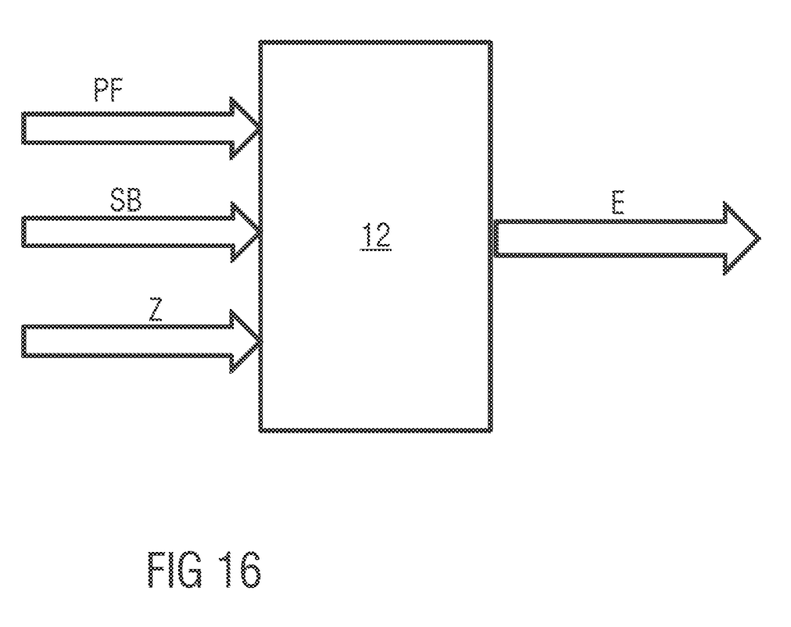
FIG. 16, schematically, is a block wiring diagram for operating the ventilation device.

FIG. 16 shows a block wiring diagram for operating the ventilation device, in particular for operatively adjusting E the air guiding element 3, the further air guiding element 7, the flap element 8 and the air deflection element 9, if this is not designed rigidly.

The adjustment is carried out by means of a position PF of the vehicle seat 1 inside the interior chamber of the vehicle, a recorded seat occupancy SB and a sensitivity to comfort and drafts Z, in particular of the vehicle user 4, wherein a corresponding input by the vehicle user 4, for example can be actuated to do so.

In relation to the position PF of the vehicle seat 1, an adjustment in terms of length and height thereof can be ascertained.

The position PF of the vehicle seat 1, the seat occupancy SB and the sensitivity to comfort and drafts form input parameters for an algorithm stored in a control unit 12 of the ventilation device, wherein by means of this a substantially optimal adjustment of the air guiding elements 3, the further air guiding element 7, the flap element 8 and the air deflection element 9, if this is not designed rigidly, is ascertained.

In particular, an individual draft sensitivity of the vehicle user 4 and/or the vehicle occupant 5 is ascertained by means of the artificial intelligence algorithm, and the adjustment E is correspondingly undertaken, in order to be able to implement a ventilation in the vehicle 2 as free of drafts as possible.

The invention claimed is:

1. A ventilation device of a vehicle, comprising:
    an air outflow opening disposed on an upper side of a backrest of a seat of the vehicle such that an airflow from the air outflow opening flows in a direction of a roof of the vehicle;
    a plurality of air guiding elements pivotably mounted in a region of the air outflow opening, wherein an air volume of a front partial airflow and a rear partial airflow is settable by the plurality of air guiding elements;
    a further air guiding element disposed on the roof in a region of the airflow, wherein the airflow is dividable and deflectable by the further air guiding element; and
    a flap element pivotably mounted in an upper region of the backrest, wherein the air outflow opening is enlargeable by the flap element.

2. The ventilation device according to claim 1, wherein the further air guiding element is configured to divide the airflow into the front partial airflow and the rear partial airflow.

3. The ventilation device according to claim 1, wherein the further air guiding element is inflatable.

4. The ventilation device according to claim 1, further comprising an air deflection element disposed in a front region of the roof.

5. A method for operating the ventilation device according to claim 1, comprising the step of:
    automatically positioning the plurality of air guiding elements depending on a position of the seat in the vehicle, depending on an inclination of the backrest, depending on a seat occupancy, and/or depending on a comfort and draft sensitivity of a user or an occupant of the vehicle.

6. The method according to claim 5, further comprising the step of automatically positioning the pivotably mounted flap element, the further air guiding element, and/or a deflection element depending on the position of the seat in the vehicle, depending on the inclination of the backrest, depending on the seat occupancy, and/or depending on the comfort and draft sensitivity of the user or the occupant of the vehicle.

7. The ventilation device according to claim 1, wherein the further air guiding element is a plate and is disposed pivotably on the roof.

* * * * *